United States Patent
Pendyala et al.

(10) Patent No.: US 11,665,103 B2
(45) Date of Patent: May 30, 2023

(54) DYNAMIC PACKET DATA CONVERGENCE PROTOCOL REORDERING

(71) Applicant: NXP USA, Inc., Austin, TX (US)

(72) Inventors: Harishchandra Pendyala, Hyderabad (IN); Suhail Mohmmed, Hyderabad (IN)

(73) Assignee: NXP USA, Inc., Austin, TX (US)

(*) Notice: Subject to any disclaimer, the term of this patent is extended or adjusted under 35 U.S.C. 154(b) by 15 days.

(21) Appl. No.: 17/304,218

(22) Filed: Jun. 16, 2021

(65) Prior Publication Data

US 2022/0407811 A1 Dec. 22, 2022

(51) Int. Cl.
*H04L 47/34* (2022.01)
*H04L 47/56* (2022.01)
*H04L 47/30* (2022.01)
*H04L 47/28* (2022.01)
*H04W 8/04* (2009.01)

(52) U.S. Cl.
CPC .......... *H04L 47/34* (2013.01); *H04L 47/28* (2013.01); *H04L 47/30* (2013.01); *H04L 47/564* (2013.01); *H04W 8/04* (2013.01)

(58) Field of Classification Search
CPC ......... H04L 47/34; H04L 47/28; H04L 47/30; H04L 47/564; H04W 8/04
See application file for complete search history.

(56) References Cited

U.S. PATENT DOCUMENTS

| | | | |
|---|---|---|---|
| 9,629,146 B2 | 4/2017 | Yi et al. | |
| 10,736,174 B2 | 8/2020 | Wittberg et al. | |
| 11,387,945 B1* | 7/2022 | Bathwal | H04L 1/1678 |
| 2019/0044880 A1* | 2/2019 | Yi | H04L 47/624 |
| 2019/0053098 A1* | 2/2019 | Jo | H04W 88/16 |
| 2019/0268801 A1* | 8/2019 | Wang | H04W 76/16 |
| 2020/0100324 A1* | 3/2020 | Wittberg | H04W 80/08 |
| 2022/0070659 A1* | 3/2022 | Balasubramanian | H04W 8/22 |

FOREIGN PATENT DOCUMENTS

KR 20180037960 A 4/2018

* cited by examiner

*Primary Examiner* — Jung H Park

(57) ABSTRACT

A method of processing received Packet Data Convergence Protocol (PDCP) data packets in a PDCP layer module of a telecommunications base station, includes receiving by the PDCP layer module a plurality of data packets, determining by an analysis module of the PDCP layer module a proportion of the data packets received out of sequence over a predetermined number of received data packets, setting an expiry time of a reordering timer of a buffering and reordering module of the PDCP layer module according to the proportion, and starting the reordering timer upon receiving an out of sequence data packet in which the out of sequence data packet is added to a reordering buffer of the buffering and reordering module. If the reordering timer reaches the expiry time, data packets are removed from the reordering buffer and transferred from the PDCP layer module to another layer module of the base station.

16 Claims, 3 Drawing Sheets

DYNAMIC PACKET DATA CONVERGENCE PROTOCOL REORDERING

FIELD

The disclosure relates to dynamically reordering Packet Data Convergence Protocol (PDCP) data packets for use in LTE or fifth generation (5G) telecommunications.

BACKGROUND

The Packet Data Convergence Protocol (PDCP) forms one of a number of layers of the 5G NR (New Radio) protocol stack. PDCP data packets are transmitted between User Equipment (UE) such as a mobile device and a base station, known in a 5G network as a 5G NR gNodeB or gNB. PDCP packets are coded with sequence numbers (SNs), which allow their correct order to be determined on being received by a gNB. Normally, PDCP packets will be received by a gNB in sequence, i.e. with consecutive SNs received in consecutively received packets. In some cases, however, packets can be received out of sequence, for example due to a UE being connected to two different radio units simultaneously. Receipt of out of order PDCP data packets can affect the function and performance of a gNB because additional steps are required to reorder packets as well as to wait until all packets are received. Air side conditions between UEs and gNB can also impact the data plane performance for both uplink (UL) and downlink (DL) transmissions.

BRIEF DESCRIPTION OF DRAWINGS

Embodiments will be described, by way of example only, with reference to the drawings, in which.

Figure 1:
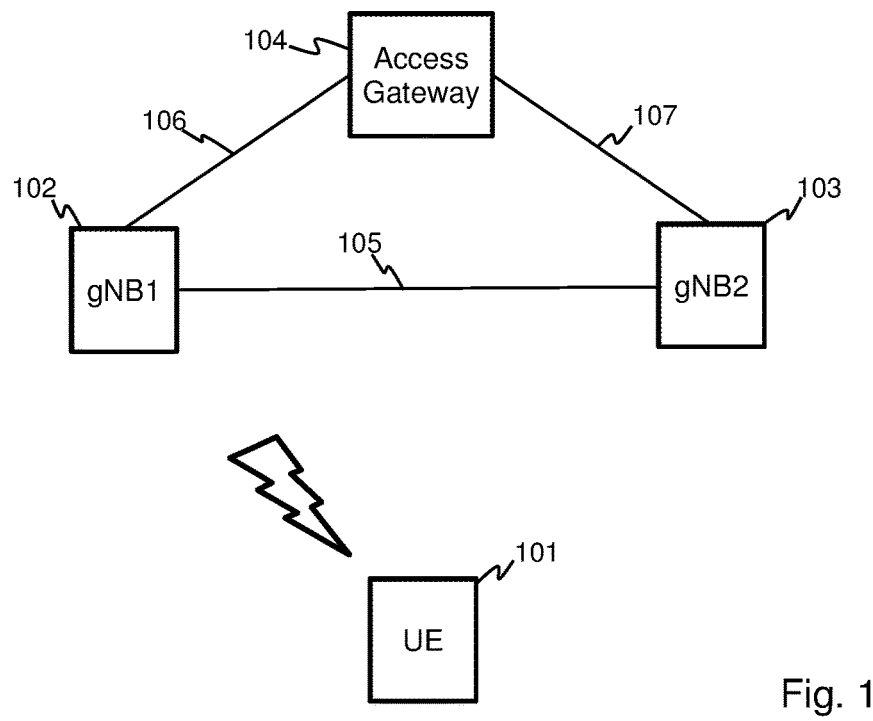
FIG. 1 is a schematic diagram of a UE in communication with a gNB in a 5G NR network.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

With the introduction of dual connectivity (LTE-NR or NR-NR), a UE may connect to two different radio units (RUs) simultaneously for parallel data transmission. This can lead to a higher possibility of UL data packets being received out of order, which may be further affected by air conditions between the UE and gNB.

An example arrangement of a 5G NR network is illustrated schematically in FIG. 1. A UE 101, for example a mobile communication device such as a 5G enabled smart phone, communicates with a first gNB 102 (gNB1). The UE may also communicate with a second gNB 103 (gNB2) depending on a signal strength, which may depend on the relative positions of the UE and gNBs 102, 103. As the UE moves away from gNB1 102 and closer to gNB2 103, communication switches between UE-gNB1 and UE-gNB2.

The gNBs 102, 103 are connected to each other via an internode communication link 105 and to an access gateway 104 via gateway communications links 106, 107. The access gateway 104 provides access to a core network (not shown) of the 5G network, enabling the UE to access other UEs and the internet.

Figure 2:
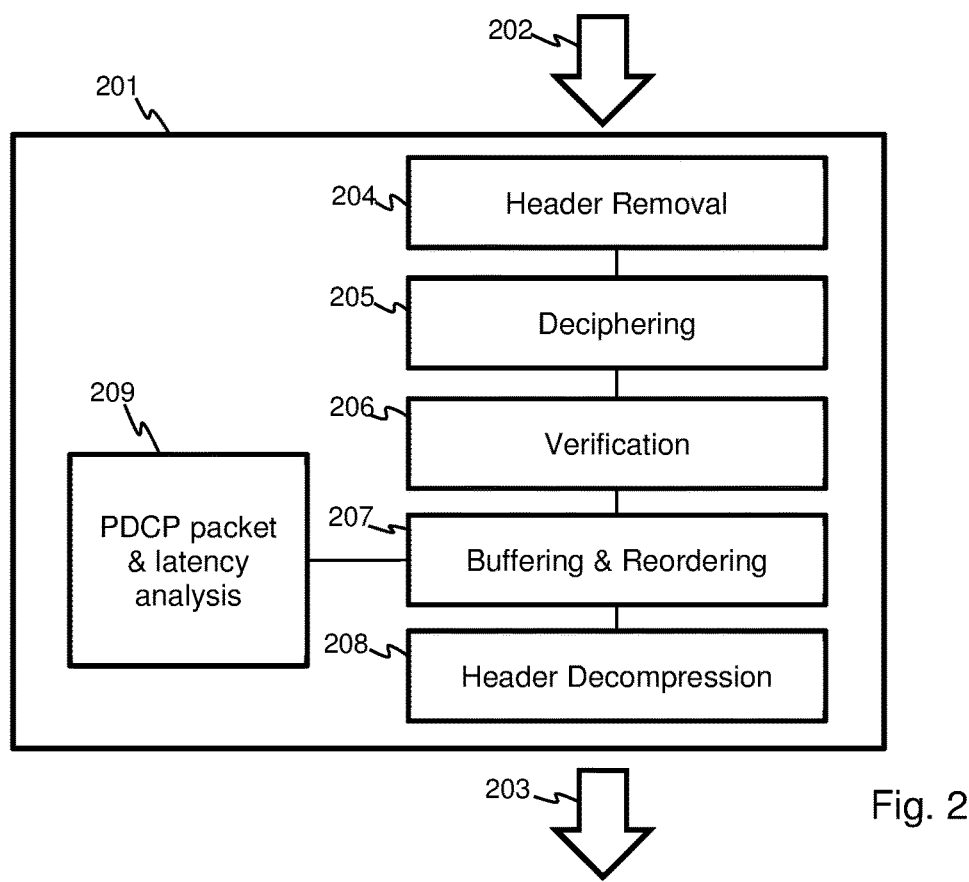
FIG. 2 is a schematic diagram of an example 5G NR gNB PDCP module.

Each gNB comprises multiple modules that process incoming and outgoing signals through multiple layers, each of which are defined by various 3GPP specifications. One of the layers is a PDCP layer, in which PDCP packets received by the gNB are received and processed before being transferred to another layer. A schematic diagram of an example PDCP layer module 201 is illustrated in FIG. 2. Incoming signals in the form of PDCP data packets 202 are received by the module 201 and outgoing data packets 203 that have been processed and, if necessary, reordered, are transmitted by the module 201.

The PDCP layer module 201 comprises a header removal module 204, a deciphering module 205, a verification module 206, a buffering a reordering module 207 and a header decompression module 208. The PDCP layer module 201 also comprises an analysis module 209, which analyses packets from, and provides an input to, the buffering and reordering module 207.

As packets 202 are received by the PDCP layer module 201, the packets are first processed by the header removal module 204, which removes the PDCP packet headers from each packet. The packets are then deciphered by the deciphering module 205 and verified by the verification module 206. The packets are then processed by the buffering and reordering module 207, which checks the SN of each packet and, if necessary, buffers and reorders packets so that they are in correct sequence. Following this, the header decompression module 208 decompresses the PDCP packet header and the data packets 203 are transmitted to another layer of the 5G NR gNB.

While processing UL data from a UE at the gNB, UL SNs are always expected to be received in incrementing order. If a received UL SN does not match the next expected SN, the buffering and reordering module 207 will keep the packet in a reordering buffer and a reordering timer is started. If the missing/in-order UL SN is not received within a stipulated time, UL PDUs held in the reordering buffer are sent to upper layers.

Conventionally, a fixed value of the reordering timeout is used in a typical gNB PDCP layer module configuration. This configuration may be adequate provided the UL data rates are not high. However, with increased significant UL data rates a fixed timeout value may cause problems, particularly for a connection requiring low latency and high speed.

To achieve low latency along with high UL throughput, a small reordering timeout value is required. However, if a fixed small value is used, this will in practice lead to frequent out-of-order PDU transmission to upper layers. Similarly, to achieve in-order UL transmission a large value would be required, but this will lead to high latency in the case of UL out-of-order detection. In summary therefore, fixing a value for the reordering timeout cannot guarantee the required result in a range of situations that may occur in practice.

To overcome this problem, the present disclosure introduces the use of a dynamic or adaptive value for a reordering timeout. During processing of UL data, the reordering timeout can keep changing, based on different factors as detailed below. Whenever the reordering timer needs to be started, it will assume the current dynamically generated value as determined based on a latest assessment.

The reordering timeout value may be determined as a function of a PDCP UL PDU SN reception pattern and/or a measured latency between consecutive PDCP UL SN packets. Table 1 below illustrates example scenarios in which different values for the reordering time may be selected based on a ratio of out of order packets being received and a measure of latency between successive packets. The dynamic reordering time may be based on a fixed maximum reordering time, for example 100 ms, which is adjusted according to a current measured value of the out of order ratio a and the determined latency value b.

TABLE 1

Example scenarios with corresponding dynamic reordering time values.

| Scenario | a - Ratio of (Out-of-order UL SN/Total No. of SN) | b - Latency between consecutive UL SN (ms) | Max. Reordering Time (ms) | Dynamic Reordering time (ms) | Comments |
|---|---|---|---|---|---|
| 1 | 2/100 | 1 | 100 | 2 | |
| 2 | 50/100 | 1 | 100 | 50 | Air condition is bad compared to #1 => timeout increased. |
| 3 | 2/100 | 5 | 100 | 10 | Latency is high compared to #1 => timeout increased. |
| 4 | 2/100 | 1 | 100 | 2 | Air condition is better compared to #2, Latency is low compared to #3 => timeout decreased. |

In the first example scenario, the ratio of out of order packets to received packets is low at 2/100 and the latency is also low. The reordering time is therefore set to be low, for example 2 ms. In the second scenario, the ratio has increased to 50/100 while the latency is unchanged and low, resulting in an increased reordering time to 50 ms to allow out of order packets to be received before the timeout value expires. This scenario may for example be due to poor air conditions. In the third scenario, the ratio is low at 2/100 but the latency increases to 5 ms, resulting in an increase of the timeout value to 10 ms, allowing the few data packets that are received out of order to be reordered before the timeout value expires. In the fourth scenario, the conditions return to those of the first scenario, with a low ratio and a low latency, resulting in a return to a low timeout value.

The dynamic value for the reordering timeout, t, may therefore be defined as:

$$t = f(a, b)$$

where a is the ratio of out of order PDCP packets to total number of received packets, for example the number of out of order packets received every 100 packets, and b is the latency (i.e. time gap) between consecutive data packets. The values for a and b may be calculated and updated continuously in the PDCP module 201 by the analysis module 209 and an updated value for t provided to the buffering and reordering module 207. Whenever the buffering and reordering module 207 encounters an out of order data packet, the current value of t is used to start the reordering timer.

The timeout value may be calculated as a multiple of a maximum timeout value $t_{max}$, the latency a and the ratio b, together with a constant k, i.e.:

$$t = k t_{max} a b$$

The constant k may be chosen to be 1 or another value dependent on the required proportion of $t_{max}$. In the examples provided in Table 1, k is 1, with a being a number of out of order packets per hundred received packets and b the measured latency in ms.

The dynamic timeout value may be calculated based on a current utilization of total number of buffers in the PDCP layer module 201. The dynamic timeout value may also or alternatively be calculated based on a measure of CPU utilization in the PDCP layer module 201. These considerations may for example be taken into account in determining the constant k.

Figure 3:
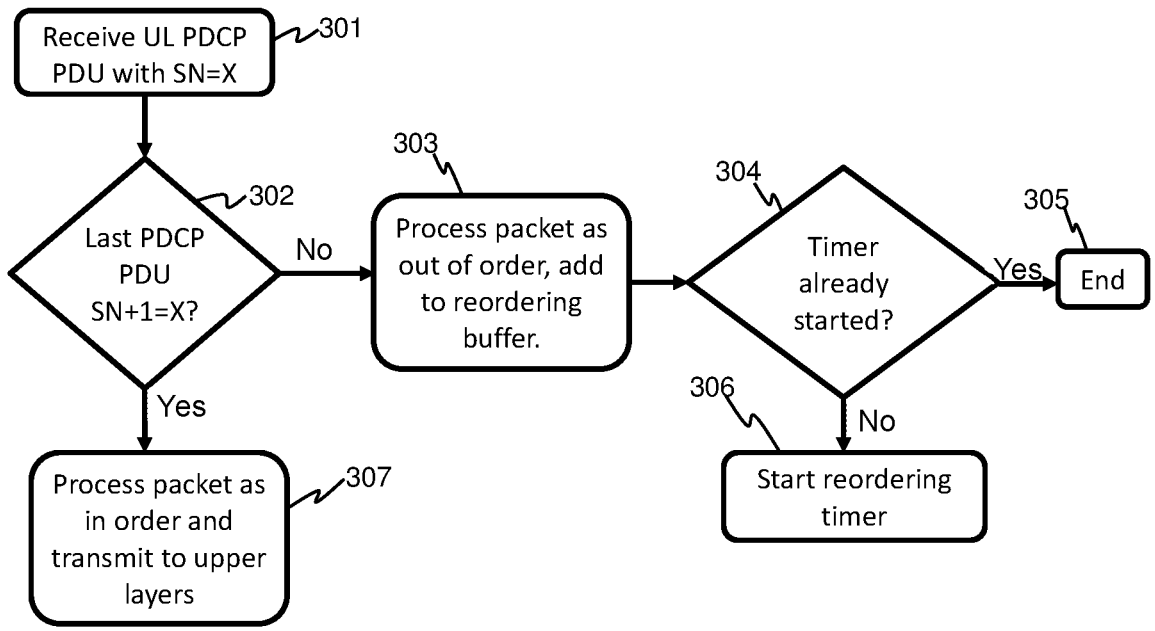
FIG. 3 is a flow diagram of an example method of processing a received PDCP packet in a PDCP module.
Figure 4:
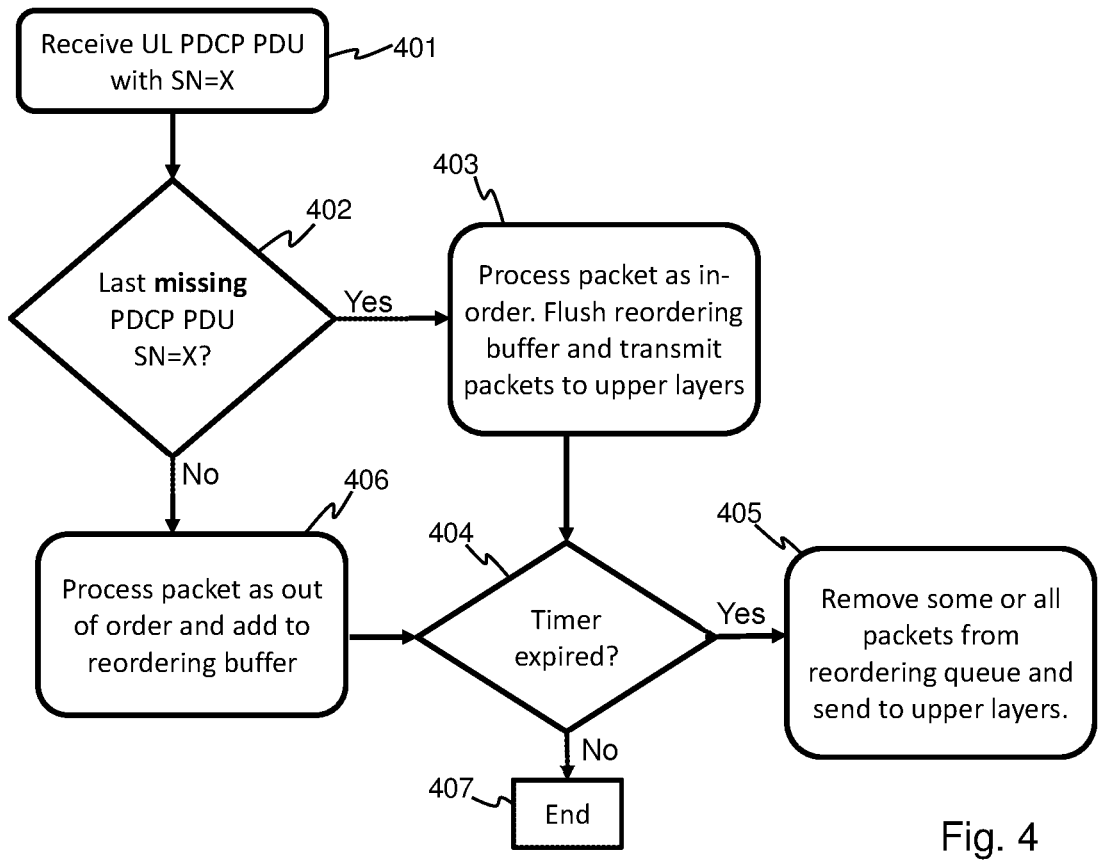
FIG. 4 is a flow diagram of an example method of processing a received PDCP packet in a PDCP module.
Figure 5:
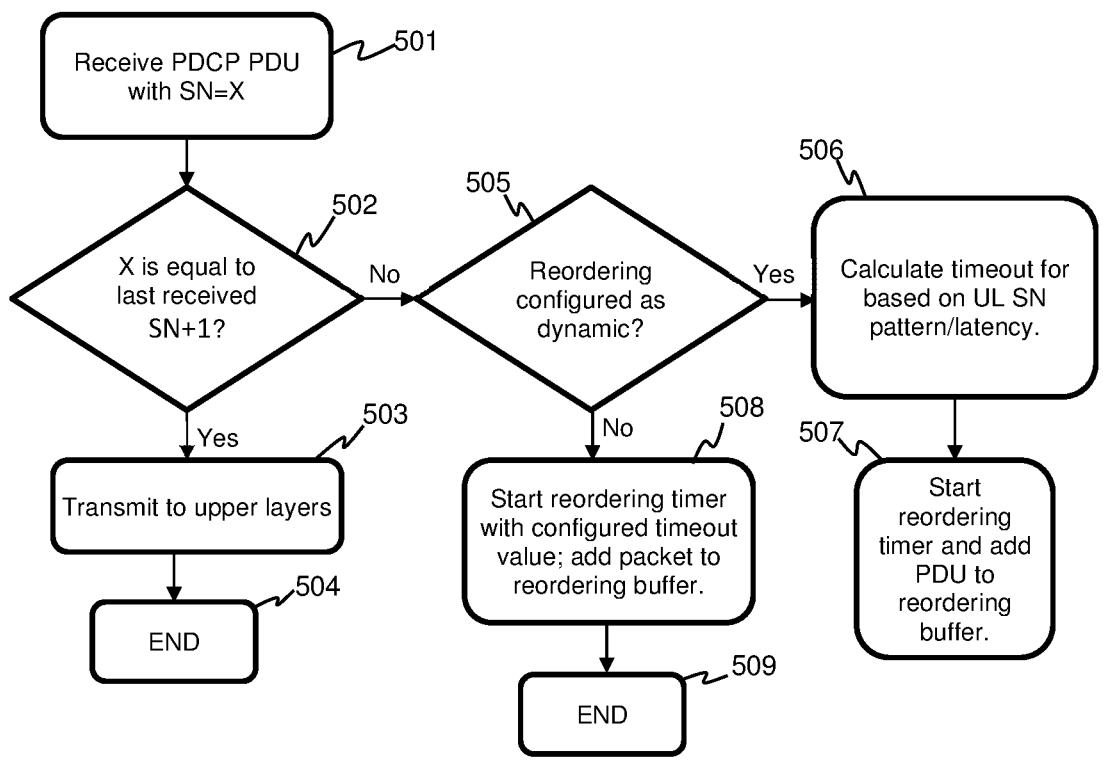
FIG. 5 is a flow diagram of an example method of setting and starting a reordering timer.

FIGS. 3, 4 and 5 are schematic flow diagrams that illustrate example routines forming parts of the above described methods. FIG. 3 illustrates a sequence of operations involved when receiving a PDCP data packet by the buffering and reordering module 207, in which the reordering timer may be started. FIG. 4 illustrates a sequence of operations involved when receiving a PDCP data packet after the reordering timer has started. FIG. 5 illustrates an example sequence of operations in which a timeout value is determined based on SN pattern and/or latency as packets are received out of order.

The method illustrated in FIG. 3 begins with a PDCP data packet being received from a UL with an SN=X (step 301). The PDCP layer module first checks whether the received data packet is in sequence, i.e. whether X is equal to the SN of an immediately preceding data packet +1 (step 302). If the answer is no, the received packet is processed as an out of sequence packet (303) and added to a reordering buffer. A check is made (step 304) of whether the reordering timer has been started. If not, the timer is started (step 306), otherwise the process ends (step 305). If the received packet is in sequence at step 302, the packet is processed as being in order and is transmitted to upper layers (step 307). In both cases, the process repeats for each received packet.

FIG. 4 illustrates a process in which a packet is processed while the reordering timer is running. At step 401 a data packet is received with an SN=X. A check is made at step 402 whether the SN of the packet corresponds with a last missing packet. If true, the packet is processed in step 403 as an in-order packet, the reordering buffer is flushed and the packets in the buffer are transmitted to upper layers of the 5G NR gNB. If the packet is not a missing packet, it is processed as an out of order packet at step 406 and added to the reordering buffer. In both cases, a check is then made of whether the timer has expired (step 404). If not, the process ends (step 407). If the timer has expired, at step 405, some or all of the packets in the reordering buffer are removed from the reordering buffer and sent out of sequence to the upper layers. In some examples, a specified number of packets may be removed from the reordering buffer based on a sequence of packets starting with a packet received out of sequence that triggered the reordering timer being started. As with the process in FIG. 3, the process in FIG. 4 repeats for each sequential data packet received.

FIG. 5 illustrates a process in which the reordering timer expiry limit is determined dynamically. In step 501, a data packet is received with an SN=X. A check is made at step 502 whether the SN is equal to a last received SN+1. If it is, i.e. if the packet is received in sequence, the packet is transmitted to upper layers (step 503) and the process ends (step 504). If not, at step 505 a check is made whether the reordering process is configured to be dynamic or static. If static, the reordering time is started at step 508 with a configured timeout value, the packet is added to the reordering buffer and the process ends (step 509). If the reordering process is configured to be dynamic, at step 506, a calculation is made for the reordering timeout value based on the UL SN pattern and/or latency of the received packets. At step 507, the reordering timer is started and the packet added to the reordering buffer. As with the processes in FIGS. 3 and 4, the process in FIG. 5 repeats and runs continuously as packets are received.

Aspects of the present disclosure may be applied to LTE or 5G PDCP UL data processing, and may be applied to eNB, gNB or small cell family of products.

From reading the present disclosure, other variations and modifications will be apparent to the skilled person. Such variations and modifications may involve equivalent and other features which are already known in the art of 5G NR networks, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

According to a first aspect there is provided a method of processing received PDCP data packets in a PDCP layer module of a telecommunications base station, each data packet having a sequence number (SN), and the method includes receiving by the PDCP layer module a plurality of data packets; determining by an analysis module of the PDCP layer module a proportion of the data packets received out of sequence over a predetermined number of received data packets; setting by the analysis module an expiry time of a reordering timer of a buffering and reordering module of the PDCP layer module according to the proportion; starting by the buffering and reordering module the reordering timer upon receiving an out of sequence data packet, the out of sequence data packet being added to a reordering buffer of the buffering and reordering module; and if the reordering timer reaches the expiry time, removing data packets from the reordering buffer and transferring the data packets removed from the reordering buffer from the PDCP layer module to another layer module of the base station. Setting an expiry time of the reordering timer according to a proportion of out of sequence packets received enables a dynamic value for a timeout before reordering, which allows for UL data processing to be optimized without affecting the overall function of the base station.

Some or all of the data packets may be removed from the reordering buffer on reaching the expiry time. In some examples, a specified number of packets may be removed from the reordering buffer based on a sequence of packets including or starting with a packet received out of sequence that triggered the reordering timer being started.

The analysis module may also determine a latency measure between consecutive received PDCP packets and adjust the expiry time according to the determined latency measure. The expiry time may be increased if the latency measure increases and may be decreased if the latency measure decreases. Dynamically adjusting the expiry time according to interpacket latency reduces the possibility of the reordering timer expiring unnecessarily if latency increases, for example due to air interface conditions and signal strength.

The expiry time may be determined by the analysis module according to a function of the determined latency measure and the determined proportion of out of sequence packets received. The expiry time may for example be calculated by multiplying the determined proportion of out of sequence packets by the determined latency time and a maximum expiry time value.

According to a second aspect there is provided a PDCP layer module of a telecommunications base station, the PDCP layer module configured to receive and process PDCP data packets and includes a buffering and reordering module; and an analysis module configured to determine a proportion of data packets received out of sequence over a predetermined number of received data packets and to set an expiry time of a reordering timer of the buffering and reordering module according to the proportion. The buffering and reordering module is configured to start the reordering timer upon receiving an out of sequence data packet and add the out of sequence data packet to a reordering buffer of the buffering and reordering module; and if the reordering timer reaches the expiry time, remove data packets from the reordering buffer and transfer the data packets removed from the reordering buffer from the PDCP layer module to another layer module of the base station. Other features of the first aspect may also be applied to the second aspect.

According to a third aspect there is provided a computer program comprising instructions to cause a computer processor of a telecommunications base station to process received PDCP data packets in a PDCP layer module, each data packet having a sequence number (SN) by receiving by the PDCP layer module a plurality of data packets; determining by an analysis module of the PDCP layer module a proportion of the data packets received out of sequence over a predetermined number of received data packets; setting by the analysis module an expiry time of a reordering timer of a buffering and reordering module of the PDCP layer module according to the proportion; starting by the buffering and reordering module the reordering timer upon receiving an out of sequence data packet, the out of sequence data packet being added to a reordering buffer of the buffering and reordering module; and if the reordering timer reaches the expiry time, removing data packets from the reordering buffer and transferring the data packets removed from the reordering buffer from the PDCP layer module to another layer module of the base station. Other features of the first aspect may also apply to the third aspect.

There may be provided a computer program, which when run on a computer, causes the computer to configure a PDCP layer module to perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a non-transitory computer readable medium, which may be a physical computer readable medium, such as a disc or a memory device, or may be embodied as a transient signal. Such a transient signal may be a network download, including an internet download.

The invention claimed is:

1. A method of processing received PDCP data packets in a PDCP layer module of a telecommunications base station, each data packet having a sequence number (SN), the method comprising:
   receiving by the PDCP layer module a plurality of data packets;
   determining by an analysis module of the PDCP layer module a proportion of the data packets received out of sequence over a predetermined number of received data packets;
   setting by the analysis module an expiry time of a reordering timer of a buffering and reordering module of the PDCP layer module according to the proportion;
   starting by the buffering and reordering module the reordering timer upon receiving an out of sequence data packet, the out of sequence data packet being added to a reordering buffer of the buffering and reordering module; and
   if the reordering timer reaches the expiry time, removing data packets from the reordering buffer and transferring the data packets removed from the reordering buffer from the PDCP layer module to another layer module of the base station, wherein the analysis module determines a latency measure between consecutive received PDCP packets and sets the expiry time according to a function of the determined latency measure and the determined proportion of out of sequence packets received.

2. The method of claim 1, wherein the analysis module increases the expiry time if the proportion of data packets received out of sequence increases and decreases the expiry time if the proportion of data packets received out of sequence decreases.

3. The method of claim 1, wherein the analysis module increases the expiry time if the latency measure increases and decreases the expiry time if the latency measure decreases.

4. The method of claim 1, wherein the expiry time is calculated by multiplying the determined proportion of out of sequence packets by the determined latency time and a maximum expiry time value.

5. The method of claim 4, wherein the timeout value is calculated as a multiple of a maximum timeout value $t_{max}$, the latency time a, the proportion of out of sequence packets b and a constant k such that $$t = kt_{max}ab.$$

6. The method of claim 1, wherein the base station is selected from a group of an LTE base station, a 5G NR gNB and a 5G NR eNB.

7. A PDCP layer module of a telecommunications base station, the PDCP layer module configured to receive and process PDCP data packets and comprising:
   a buffering and reordering module; and
   an analysis module configured to determine a proportion of data packets received out of sequence over a predetermined number of received data packets and to set an expiry time of a reordering timer of the buffering and reordering module according to the proportion,
   wherein the buffering and reordering module is configured to:
   start the reordering timer upon receiving an out of sequence data packet and add the out of sequence data packet to a reordering buffer of the buffering and reordering module; and
   if the reordering timer reaches the expiry time, remove data packets from the reordering buffer and transfer the data packets removed from the reordering buffer from the PDCP layer module to another layer module of the base station, wherein the timeout value is calculated as a multiple of a maximum timeout value $t_{max}$, the latency time a, the proportion of out of sequence packets b and a constant k such that $t = kt_{max}ab$.

8. The PDCP layer module of claim 7, wherein the analysis module is configured to increase the expiry time if the proportion of data packets received out of sequence increases and to decrease the expiry time if the proportion of data packets received out of sequence decreases.

9. The PDCP layer module of claim 7, wherein the analysis module is configured to determine a latency measure between consecutive received PDCP packets and set the expiry time according to the proportion and to the determined latency measure.

10. The PDCP layer module of claim 9, wherein the analysis module is configured to increases the expiry time if the latency measure increases and decrease the expiry time if the latency measure decreases.

11. The PDCP layer module of claim 9, wherein the analysis module is configured to determine the expiry time according to a function of the determined latency measure and the determined proportion of out of sequence packets received.

12. The PDCP layer module of claim 7, wherein the base station is selected from a group of an LTE base station, a 5G NR gNB and a 5G NR eNB.

13. A computer program product provided on a non-transitory computer readable medium, the computer program comprising instructions to cause a computer processor of a telecommunications base station to process received PDCP data packets in a PDCP layer module, each data packet having a sequence number, SN, by:
   receiving by the PDCP layer module a plurality of data packets;
   determining by an analysis module of the PDCP layer module a proportion of the data packets received out of sequence over a predetermined number of received data packets;
   setting by the analysis module an expiry time of a reordering timer of a buffering and reordering module of the PDCP layer module according to the proportion;
   starting by the buffering and reordering module the reordering timer upon receiving an out of sequence data packet, the out of sequence data packet being added to a reordering buffer of the buffering and reordering module; and if the reordering timer reaches the expiry time, removing data packets from the reordering buffer and transferring the data packets removed from the reordering buffer from the PDCP layer module to another layer module of the base station, wherein the expiry time is calculated by multiplying the determined proportion of out of sequence packets by the determined latency time and a maximum expiry time value.

14. The computer program product of claim 13, wherein the analysis module determines a latency measure between consecutive received PDCP packets and sets the expiry time according to the proportion and to the determined latency measure.

15. The computer program product of claim 14, wherein the expiry time is determined by the analysis module according to a function of the determined latency measure and the determined proportion of out of sequence packets received.

16. The computer program product of claim 13 wherein the expiry value is calculated as a multiple of a maximum timeout value $t_{max}$, the latency time a, the proportion of out of sequence packets b and a constant k such that $$t = k t_{max} a b.$$

* * * * *